United States Patent
Kim et al.

(10) Patent No.: US 8,875,906 B2
(45) Date of Patent: Nov. 4, 2014

(54) REVERSE OSMOSIS MEMBRANE INCLUDING NANO-SILVER WIRE LAYER AND FABRICATION METHOD THEREOF

(71) Applicant: LG Chem, Ltd., Seoul (KR)

(72) Inventors: Jae-Hong Kim, Seongnam-si (KR); Phill Lee, Daejeon (KR); Young-Ju Lee, Daegu (KR); Chong-Kyu Shin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/005,822

(22) PCT Filed: Dec. 7, 2012

(86) PCT No.: PCT/KR2012/010639
§ 371 (c)(1),
(2), (4) Date: Sep. 17, 2013

(87) PCT Pub. No.: WO2013/085343
PCT Pub. Date: Jun. 13, 2013

(65) Prior Publication Data
US 2014/0299537 A1    Oct. 9, 2014

(30) Foreign Application Priority Data

Dec. 8, 2011    (KR) .................. 10-2011-0130929
Dec. 7, 2012    (KR) .................. 10-2012-0141546

(51) Int. Cl.
*B01D 39/00* (2006.01)
*B01D 29/00* (2006.01)
*B01D 29/46* (2006.01)
*B05D 5/00* (2006.01)
*B01D 71/56* (2006.01)
*B01D 67/00* (2006.01)

(52) U.S. Cl.
CPC ............ *B01D 71/56* (2013.01); *B01D 67/0088* (2013.01); *B01D 2325/20* (2013.01)
USPC ........................ 210/500.38; 210/490; 427/244

(58) Field of Classification Search
CPC ...... B82Y 30/00; B82Y 99/00; C07C 69/612; C02F 2305/08; C02F 1/02; C02F 1/484; C02F 2209/02; C02F 2303/04; C02F 1/44; C02F 1/46; C02F 1/4606; C02F 1/46109; C02F 1/4672; C02F 2001/46161
USPC .................... 210/500.38, 490, 652, 502.1; 427/244–245
See application file for complete search history.

(56) References Cited

U.S. PATENT DOCUMENTS

| | | | |
|---|---|---|---|
| 6,551,536 | B1 | 4/2003 | Kwak et al. |
| 7,479,300 | B2 | 1/2009 | Koo et al. |

(Continued)

FOREIGN PATENT DOCUMENTS

| | | | |
|---|---|---|---|
| JP | 2006-281207 A | 10/2006 | |
| JP | 2009-006279 A | 1/2009 | |

(Continued)

OTHER PUBLICATIONS

Written Opinion for PCT/KR2012/010639 filed Dec. 7, 2012.

(Continued)

*Primary Examiner* — Ana Fortuna

(57) ABSTRACT

There are provided a reverse osmosis membrane comprising a porous support; a silver nanowire layer formed on the porous support; and a polyamide film formed on the silver nanowire layer, and a fabrication method of a reverse osmosis membrane, the method comprising coating a porous support with an aqueous amine solution including silver nanowires to form a silver nanowire layer; and bringing the silver nanowire layer into contact with an aliphatic hydrocarbon-based organic solution including acyl halide to form a polyamide film.

11 Claims, 3 Drawing Sheets

(56) References Cited

U.S. PATENT DOCUMENTS

| | | | |
|---|---|---|---|
| 8,567,612 B2 * | 10/2013 | Kurth et al. | 210/500.38 |
| 8,603,340 B2 | 12/2013 | Kurth et al. | |
| 8,646,614 B2 * | 2/2014 | Peterson | 209/235 |
| 8,672,142 B2 * | 3/2014 | Nishiyama et al. | 210/500.25 |
| 8,684,187 B2 * | 4/2014 | Buschmann | 210/500.38 |
| 2008/0264258 A1 | 10/2008 | Mares et al. | |
| 2009/0188861 A1 | 7/2009 | Higgin | |
| 2009/0308804 A1 | 12/2009 | Cohen et al. | |
| 2009/0321355 A1 | 12/2009 | Ratto et al. | |
| 2010/0050866 A1 | 3/2010 | Yu et al. | |
| 2010/0062156 A1 | 3/2010 | Kurth et al. | |
| 2010/0320143 A1 | 12/2010 | Konishi et al. | |
| 2012/0024572 A1 * | 2/2012 | Naoi et al. | 174/126.1 |
| 2012/0080378 A1 | 4/2012 | Revanur et al. | |
| 2012/0312734 A1 * | 12/2012 | Kalayci et al. | 210/490 |

FOREIGN PATENT DOCUMENTS

| | | |
|---|---|---|
| JP | 2009-514667 A | 4/2009 |
| JP | 2010-504854 A | 2/2010 |
| JP | 2010-194484 A | 9/2010 |
| JP | 2011-516264 A | 5/2011 |
| JP | 2011-526834 A | 10/2011 |
| JP | 2013-545593 A | 12/2013 |
| KR | 10-2006-0123823 A | 12/2006 |
| KR | 10-2009-0119075 A | 11/2009 |
| KR | 10-2010-0078822 A | 7/2010 |
| KR | 10-2010-079530 A | 7/2010 |
| KR | 10-2011-0011626 A | 2/2011 |
| WO | WO 2011/110550 A1 | 9/2011 |

OTHER PUBLICATIONS

International Search Report for PCT/KR2012/010639 mailed Feb. 21, 2013.

* cited by examiner

US 8,875,906 B2

REVERSE OSMOSIS MEMBRANE INCLUDING NANO-SILVER WIRE LAYER AND FABRICATION METHOD THEREOF

This Application is a 371 of PCT/KR2012/010639, filed on Dec. 8, 2012, which claim priority of applications Republican of Korea 10-2011-0130929 and Republican of Korea 10-2012-0141546, filed on Dec. 7, 2012.

TECHNICAL FIELD

The present invention relates to a reverse osmosis membrane and a fabrication method thereof and, more particularly, to a reverse osmosis membrane including a nano-silver wire layer interposed between a support and a polyamide film.

BACKGROUND ART

A phenomenon in which a solvent moves through a separator membrane to pass between two solutions separated by a semipermeable membrane, from a solution in which a concentration of a solute is low to a solution in which a concentration of a solute is high, is known as osmosis, and here, pressure acting on the solution in which the concentration of a solute is high due to the movement of the solvent is known as osmotic pressure. In this case, when external pressure, higher than osmotic pressure, is applied, the solvent moves toward a solution in which the concentration of a solute is low, and this phenomenon is known as reverse osmosis. Various salts or organic materials may be separated from a solution by the semipermeable membrane by using a pressure gradient as driving force on the basis of the reverse osmosis principle. A reverse osmosis membrane using a reverse osmosis phenomenon has been used to separate molecular-level material and remove salt from brackish water or sea water and supply water for domestic, commercial and industrial use.

A typical example of a reverse osmosis membrane is a polyamide-based reverse osmosis membrane. The polyamide-based reverse osmosis membrane is fabricated by a method of forming a polyamide active layer on a microporous layer support. In detail, a microporous support is formed by forming a polysulfone layer on a non-woven fabric, dipping the microporous support in an aqueous m-phenylene diamine (mDP) solution to form an mPD layer, dipping the mPD layer in an organic trimesoyl chloride (TMC) solvent to allow the mPD layer to be brought into contact with the TMC so as to be interfacially polymerized to form a polyamide layer.

Meanwhile, recently, in order to improve the performance of a reverse osmosis membrane, various raw water modification and membrane postprocessing techniques such as a method of undertaking graft polymerization on a surface of a reverse osmosis membrane by using an atmospheric plasma and vinyl monomer to enhance durability or anti-contamination properties of a polyamide layer (US 2009/0308804 A1), a method of preliminarily minimizing fouling by adding acidic polysaccharide to a feeding liquid (US 2009/0188861 A1), a method of introducing inorganic particles such as $TiO_2$, or the like, to an amide film (U.S. Pat. No. 6,551,536) have been developed.

However, these techniques show an insignificant addition effect or, since several coating layers are formed, a thickness of a reverse osmosis membrane is increased to degrade water purifying performance. In addition, a process of adding various additives to raw water, or the like, complicates a manufacturing process.

Also, as related art, a method of providing functionality by performing a surface treatment process with a surface treatment solution including silver nanoparticles dispersed therein on a reverse osmosis membrane module after manufacturing the reverse osmosis membrane module (Korean Patent Laid Open Publication No. 2010-0079530) has been proposed. However, when the reverse osmosis membrane module manufactured through the foregoing method is used in actuality on the spot, since the silver nanoparticles are mostly exposed from a surface of the reverse osmosis membrane, the silver nanoparticles are highly likely to be eluted under operational conditions of high pressure and high speed. In consideration of the revision limiting the use of two types of nano materials (silver nano and carbon nanotubes (CNT)) among existing RoHS regulated substances in the EU, taken at an environmental committee conference held on Jun. 2, 2010, the practical process of introducing silver nanoparticles to a reverse osmosis membrane through a surface treatment method is anticipated to have great difficulty in the application thereof, due to the risk of the elution of silver nanoparticles, in spite of the excellent and unique properties of silver in such as antibiotic applications, anti-contamination applications, chlorine-resistance applications, and the like.

Also, as related art, a method of directly adding silver nanoparticles in forming an ultrafilter (UF) membrane, a microfilter (MF) membrane, or a separator membrane has been attempted. However, silver nanoparticles have a particle shape (a spherical shape or an angular shape) having a surface area smaller than that of a silver nanowire. Thus, for example, in the case of a reverse osmosis membrane, silver nanoparticles are not exposed nor expressed to an outer side of a polyamide film, having difficulty in obtaining an intrinsic effect of silver.

DETAILED DESCRIPTION OF INVENTION

Technical Problem

An aspect of the present invention provides a reverse osmosis membrane having an excellent salt removal rate, permeate flow rate, chlorine-resistance, and anti-contamination, and a fabrication method thereof.

Technical Solution

According to an aspect of the present invention, there is provided a reverse osmosis membrane comprising: a porous support; a silver nanowire layer formed on the porous support; and a polyamide film formed on the silver nanowire layer.

According to another aspect of the present invention, there is provided a fabrication method of a reverse osmosis membrane, comprising: coating a porous support with an aqueous amine solution including silver nanowires to form a silver nanowire layer; and bringing the silver nanowire layer into contact with an aliphatic hydrocarbide-based organic solution including acyl halide to form a polyamide film.

The aqueous amine solution may include silver nanowires in the amount of 0.001 wt % to 0.5 wt %.

Advantageous Effects

A reverse osmosis membrane according to an embodiment of the present invention has excellent anti-contamination and chlorine-resistance properties due to the presence of the silver nanowires having antibiotic properties. Also, the reverse osmosis membrane according to an embodiment of the present invention has improved surface characteristics of the polyamide film by virtue of the silver nanowire layer, exhibiting excellent performance, relative to the related art reverse osmosis membrane, in terms of a salt removal rate and permeate flow rate.

Also, the reverse osmosis membrane according to an embodiment of the present invention is fabricated such that silver nanowires are added to an aqueous amine solution, the conventional reverse osmosis membrane fabrication facilities can be used as is, the fabrication process is simple, and a thinner reverse osmosis membrane can be implemented.

DESCRIPTIONS WITH REGARD TO REFERENCE NUMERALS

Figure 1:
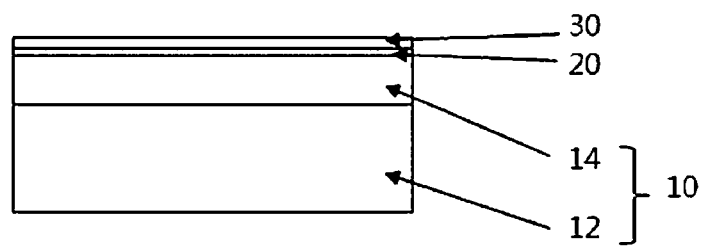
FIG. 1 is a view illustrating a structure of a reverse osmosis membrane according to an embodiment of the present invention.

10: porous support
12: non-woven fabric
14: coating layer made of a polymer material
20: silver nanowire layer
30: polyamide film

BEST MODE FOR INVENTION

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

FIG. 1 schematically illustrates a structure of a reverse osmosis membrane according to an embodiment of the present invention. As illustrated in FIG. 1, a reverse osmosis membrane according to an embodiment of the present invention has a structure in which a silver nanowire layer 20 and a polyamide film 30 are sequentially laminated on a porous support 10.

Here, the porous support 10 may be formed by forming a coating layer made of a polymer material 14 on a non-woven fabric 12. As the polymer material, for example, polysulfone, polyethersulfone, polycarbonate, polyethyleneoxide, polyimide, polyetherimide, polyetheretherketone, polypropylene, polymethylpentene, polymethylchloride, and polyvinylidene fluoride, or the like, may be used, but the present invention is not necessarily limited thereto. Among them, in particular, polysulfone is preferable.

Meanwhile, the silver nanowire layer 20 is formed on the porous support 10, and in this case, the silver nanowire layer 20 may be formed by dipping the porous support 10 into a solution containing silver nanowires.

In the present embodiment, a thickness of the silver nanowire layer may be about 1% to 50% of a thickness of the polyamide film in consideration of performance of the reverse osmosis membrane. For example, the thickness of the silver nanowire layer may be 1% to 30% or 30% to 50% of a thickness of the polyamide film. Most preferably, the thickness of the silver nanowire layer is 1% to 5% of a thickness of the polyamide film. In detail, in consideration of the fact that, in general, a thickness of the polyamide film of the reverse osmosis membrane is approximately hundreds of nanometers, preferably, ranges from 150 nm to 200 nm, a thickness of the silver nanowire layer is formed to have a thickness ranging from 0.1 nm to 100 nm, preferably, ranging from 2 nm to 10 nm.

Meanwhile, in a solution containing the silver nanowire, the silver nanowire content may range from 0.001 wt % to 0.5 wt %, preferably from 0.05 wt % to 0.15 wt %. When the silver nanowires are contained within the foregoing range, polyamide interfacial polymerization is not hampered and excellent anti-contamination properties can be obtained.

Also, in the present disclosure, nanowires are used as having the same meaning as that of a wire structure having a size of a nano-meter level, as generally used in the field of the present invention. Namely, the silver nanowires have a large surface area relative to a silver nanoparticle, have a sufficient length, relative to the silver nanoparticle form, and have random directionality. Thus, even when the fact that the silver nanowire layer is formed in the lowermost portion of the polyamide film is taken into account, the silver nanowires are exposed or expressed to an upper surface layer of the polyamide film due to the properties of the wire structure shape, obtaining the effect according to an embodiment of the present invention.

In the reverse osmosis membrane according to an embodiment of the present invention, the silver nanowire layer 20 and the polyamide film 30 are sequentially laminated on the porous support 10, so surface roughness of the polyamide film 30 may be increased due to silver nanowires of the underlying silver nanowire layer 20. Thus, the increase in the surface area can lead to the enhancement of a permeate flow rate.

Next, the polyamide film 30 may be formed through interfacial polymerization between an amine compound and an acyl halide compound. Here, the amine compound may be one or more compounds selected from the group consisting of, for example, m-phenylenediamine, p-phenylenediamine, 1,3,6-benzenetriamine, 4-chloro-1,3-phenylenediamine, 6-chloro-1,3-phenylenediamine, 3-chloro-1,4-phenylenediamine, and any mixture thereof, but the present invention is not limited thereto. Namely, the amine compound may be m-phenylenediamine, p-phenylenediamine, 1,3,6-benzenetriamine, 4-chloro-1,3-phenylenediamine, 6-chloro-1,3-phenylenediamine, 3-chloro-1,4-phenylenediamine, or any mixture thereof.

Also, the acyl halide compound may be one or more compounds selected from the group consisting of, for example, trimesoylchloride (TMC), isophthaloylchloride, and terephthaloylchloride, but the present invention is not limited thereto. Namely, the acyl halide compound may be trimesoylchloride (TMC), isophthaloylchloride, terephthaloylchloride, or any mixture thereof.

Hereinafter, a method for fabricating a reverse osmosis membrane according to an embodiment of the present invention will be described.

A method for fabricating a reverse osmosis membrane according to an embodiment of the present invention includes (1), coating a porous support with an aqueous amine solution including silver nanowires to form a silver nanowire layer, and (2), bringing an aliphatic hydrocarbide-based organic solution including acyl halide into contact to the silver nanowire layer to form a polyamide film.

First, a porous support is coated with an aqueous amine solution including silver nanowires. Here, the coating may be performed through various methods well known in the art, such as dipping, spraying, coating and the like. Preferably, the coating is performed through dipping. In the case of forming the silver nanowire layer through the dipping method, a dipping time may be relatively long, as the solution appropriately permeates through internal pores of the polysulfone porous support. For example, the dipping time may be 10 minutes or less, and preferably, it ranges from 30 seconds to 2 minutes.

Meanwhile, in this case, preferably, the amine compound is contained in the amount of 2 wt % to 5 wt %. Also, preferably, the aqueous amine solution includes silver nanowires in the amount of about 0.001 wt % to 0.5 wt %, preferably, in the amount of 0.05 to 0.15 wt %, and most preferably, 0.06 wt % to 0.08 wt %. When the content of the silver nanowires is in the foregoing range, a reduction in an active surface area due to a reduction in internal polymerization of the polyamide film is prevented and excellent anti-contamination characteristics can be obtained.

Meanwhile, a polar compound, an additive, or the like, assisting in interfacial polymerization between the amine compound and acyl halide, may be added to the aqueous amine solution within a range in which it does not degrade physical properties of the reverse osmosis membrane.

Meanwhile, after the porous support is coated with the aqueous amine solution, a surplus aqueous amine solution is removed from the surface of the support by using a roller, an air knife, a sponge, or the like, and the porous support is dried to form a silver nanowire layer.

Here, the silver nanowire layer formed thusly includes the silver nanowires and the amine compound.

Thereafter, the silver nanowire layer is brought into contact with an aliphatic hydrocarbide-based organic solution including acyl halide. During this process, the amine compound coated on the surface of the silver nanowire layer is reacted with the acyl halide compound to form polyamide, according to interfacial polymerization, and as the polyamide is adsorbed, a polyamide film is formed.

Herein, since silver nanowires exist only in the aqueous amine solution, i.e., a lower portion of the interface, when the polyamide polymerization is completed, silver nanowires are only settled between the lowermost portion of the polyamide film and the uppermost portion of the porous support. Thus, after the fabrication of the reverse osmosis membrane, the silver nanowires cannot be eluted to the outside of the polyamide film even under operational conditions of high pressure and high speed, and the reverse osmosis membrane can be stably used. In other words, the silver nanowires are embedded in a portion or the entirety of the silver nanowire layer, or, exceptionally, the silver nanowires may be embedded in a portion or the entirety of the polyamide film due to a high aspect ratio of the silver nanowires, and thus, the possibility of the elution of the silver nanowires to outside of the polyamide film is significantly low. Thus, the reverse osmosis membrane is free from environmental contamination, or the like.

Here, the aliphatic hydrocarbide-based organic solution including the acyl halide may contain the acyl halide compound, such as trimesoyl chloride, isophthaloyl chloride, and terephthaloyl chloride, in the amount of 0.1 wt % to 0.5 wt %. Meanwhile, as the organic solvent, a solvent, inactive in the interfacial polymerization, does not form a chemical bond with the halide compound, and does not damage the porous support layer, may be used. For example, IsoPar (Exxon), ISOL-C (SK Chem.), ISOL-G (SK Chem.), or the like, may be used, but the present invention is not limited thereto.

After the polyamide film is formed, it is dried and cleaned. Here, the drying may be performed at a temperature ranging from 40° C. to 80° C. for two to ten minutes. Also, the cleaning may be performed in an aqueous basic solution for example, but the present invention is not limited thereto. An available aqueous basic solution may include, for example, an aqueous solution of sodium carbonate, but the present invention is not limited thereto. In detail, the cleaning may be performed in an aqueous solution of sodium carbonate at a temperature ranging from 20° C. to 40° C. for two to ten hours.

The reverse osmosis membrane fabricated according to the foregoing method has excellent anti-contamination and chlorine-resistance due to the unique properties of silver because the silver nanowire layer is formed between the porous support and the polyamide film therein. Besides, research undertaken by the inventors of the present application shows that the formation of the silver nanowire layer between the porous support and the polyamide film improved surface characteristics of the polyamide film by virtue of the silver nanowire layer and initial salt removal rate and initial permeate flow rate characteristics were resultantly excellent.

In detail, the reverse osmosis membrane according to an embodiment of the present invention had an initial salt rejection coefficient equal to or greater than 90%, more preferably, equal to or greater than 94%, and most preferably, equal to or greater than 98%, and an initial permeate flow rate equal to or greater than 40 gallon/ft$^2$·day, more preferably, equal to or greater than 42 gallon/ft$^2$·day, and most preferably, equal to or greater than 44 gallon/ft$^2$·day.

Also, the reverse osmosis membrane according to an embodiment of the present invention had a salt rejection coefficient equal to or greater than 90%, preferably, equal to or greater than 96%, and a permeate flow rate equal to or greater than 36 gallon/ft$^2$·day, and more preferably, 40 gallon/ft$^2$·day, when two hours had elapsed after the injection of casein, exhibiting excellent anti-contamination properties.

Also, the reverse osmosis membrane according to an embodiment of the present invention had a salt rejection coefficient equal to or greater than 80%, and more preferably, equal to or greater than 90%, and a permeate flow rate equal to or greater than 37 gallon/ft$^2$·day, and more preferably, 40 gallon/ft$^2$·day, when twelve hours had elapsed after the rejection of an aqueous NaOCl solution of 2,000 ppm, exhibiting excellent chlorine-resistance properties.

MODE FOR INVENTION

Hereinafter, embodiments of the present invention will be described in detail.

Embodiment 1

18 wt % of polysulfone solid content was put into a DMF (N,N-dimethylformamide) solution and dissolved at a temperature equal to 80° C. for twelve or more hours to obtain an even liquid phase. This solution was cast to have a thickness ranging from 45 μm to 50 μm on non-woven fabric made of a polyester material and having a thickness ranging from 95 μm to 100 μm to form a porous polysulfone support.

The porous polysulfone support formed according to the foregoing method was dipped into an aqueous solution including 2 wt % of metaphenylenediamine and 0.001 wt % of silver nanowires for two minutes and taken out, a surplus aqueous solution on the support was removed by using a 25 psi roller, and the support was dried at room temperature for one minute.

Thereafter, the support was dipped into 0.1 wt % of trimesoylchloride organic solution using an ISOL-C (SK Chem.) solvent for one minute and taken out, and dried in an oven having a temperature equal to 60° C. for ten minutes. Thereafter, the support was washed in a 0.2 wt % of aqueous solution of sodium carbonate in room temperature for two or more hours, and subsequently washed with distilled water to fabricate a reverse osmosis membrane.

Embodiment 2

A reverse osmosis membrane was fabricated in the same manner as that of Embodiment 1, except that the silver nanowires were contained in the amount of 0.005 wt %.

Embodiment 3

A reverse osmosis membrane was fabricated in the same manner as that of Embodiment 1, except that the silver nanowires were contained in the amount of 0.01 wt %.

Embodiment 4

A reverse osmosis membrane was fabricated in the same manner as that of Embodiment 1, except that the silver nanowires were contained in the amount of 0.05 wt %.

Embodiment 5

A reverse osmosis membrane was fabricated in the same manner as that of Embodiment 1, except that the silver nanowires were contained in the amount of 0.068 wt %.

Embodiment 6

A reverse osmosis membrane was fabricated in the same manner as that of Embodiment 1, except that the silver nanowires were contained in the amount of 0.1 wt %.

Embodiment 7

A reverse osmosis membrane was fabricated in the same manner as that of Embodiment 1, except that the silver nanowires were contained in the amount of 0.445 wt %.

Comparative Example

A reverse osmosis membrane was fabricated in the same manner as that of Embodiment 1, except that the silver nanowires were not contained and an aqueous solution including 2 wt % of metaphenylenediamine was used.

Experimental Example 1

Evaluation of Permeate Flow Rate and Salt Removal Rate

Surfaces of the reverse osmosis membranes fabricated according to Embodiment 1 to Embodiment 7 and the comparative example were cleaned with distilled water and initial salt rejection coefficients and initial permeate flow rates thereof were measured by operating an estimator at a temperature equal to 800 psi in a NaCl solution of 32,000 ppm. Table 1 below shows measurement results.

TABLE 1

|  | Initial salt rejection coefficient (%) | Initial permeate flow rate (gallon/ft$^2$ · day) |
|---|---|---|
| Embodiment 1 | 96.22 | 41.28 |
| Embodiment 2 | 96.51 | 41.83 |
| Embodiment 3 | 97.43 | 42.57 |
| Embodiment 4 | 98.18 | 44.88 |
| Embodiment 5 | 98.45 | 45.09 |
| Embodiment 6 | 97.79 | 44.24 |
| Embodiment 7 | 94.66 | 45.09 |
| Comparative example | 97.33 | 43.12 |

Experimental Example 2

Evaluation of Chlorine-Resistance

Initial salt rejection coefficients and initial permeate flow rates of the reverse osmosis membranes fabricated according to comparative example and Embodiment to Embodiment 6 having relatively excellent salt rejection coefficients and permeate flow rates in Table 1 were measured by operating an estimator at a temperature of 800 psi in a mixture of an NaCl aqueous solution of 32,000 ppm and an NaOCl aqueous solution of 2,000 ppm. Thereafter, after the lapse of six hours and 12 hours, respectively, initial salt rejection coefficients and initial permeate flow rates thereof were measured under the same conditions. Table 2 and Table 3 show the measurement results.

TABLE 2

|  | Initial salt removal rate immediately after NaOCl injected (%) | Initial salt removal rate after lapse of 6 hours (%) | Initial salt removal rate after lapse of 12 hours (%) |
|---|---|---|---|
| Embodiment 3 | 97.25 | 96.03 | 95.47 |
| Embodiment 4 | 98.70 | 98.11 | 96.89 |
| Embodiment 5 | 98.54 | 98.33 | 97.25 |
| Embodiment 6 | 97.91 | 97.60 | 96.87 |
| Comparative example | 97.43 | 94.31 | 76.39 |

TABLE 3

|  | Initial flow rate immediately after NaOCl injected (gallon/ft$^2$day) | Initial flow rate after lapse of 6 hours (gallon/ft$^2$day) | Initial flow rate after lapse of 12 hours (gallon/ft$^2$day) |
|---|---|---|---|
| Embodiment 3 | 42.82 | 42.35 | 41.84 |
| Embodiment 4 | 43.51 | 43.22 | 43.07 |
| Embodiment 5 | 45.08 | 44.91 | 44.74 |
| Embodiment 6 | 43.46 | 43.30 | 43.00 |
| Comparative example | 43.02 | 41.08 | 37.15 |

Experiment Example 3

Evaluation of Anti-Contamination Properties

The reverse osmosis membranes fabricated according to comparative example and Embodiment 3 to Embodiment 6 having relatively excellent salt rejection coefficients and permeate flow rates in Table 1 were left in a mixture of an NaCl aqueous solution of 32,000 ppm and casein of 100 ppm for two hours, and thereafter, initial salt rejection coefficients and initial permeate flow rates thereof were measured at a pressure of 800 psi. Table 4 shows the measurement results.

TABLE 4

|  | Initial flow rate immediately after the lapse of 2 hours from injection of casein (gallon/ft²day) | Salt removal rate after the lapse of 2 hours from injection of casein (%) |
| --- | --- | --- |
| Embodiment 3 | 36.13 | 96.41 |
| Embodiment 4 | 41.48 | 97.81 |
| Embodiment 5 | 42.08 | 98.15 |
| Embodiment 6 | 41.37 | 97.23 |
| Comparative example | 35.08 | 95.94 |

Based on Table 2 to Table 4, it can be seen that the reverse osmosis membranes according to the present invention has superior chlorine-resistance and anti-contamination properties to those of the reverse osmosis membrane according to comparative example.

Experimental Example 4

Evaluation of Surface Characteristics of Polyamide Film

Figure 2:
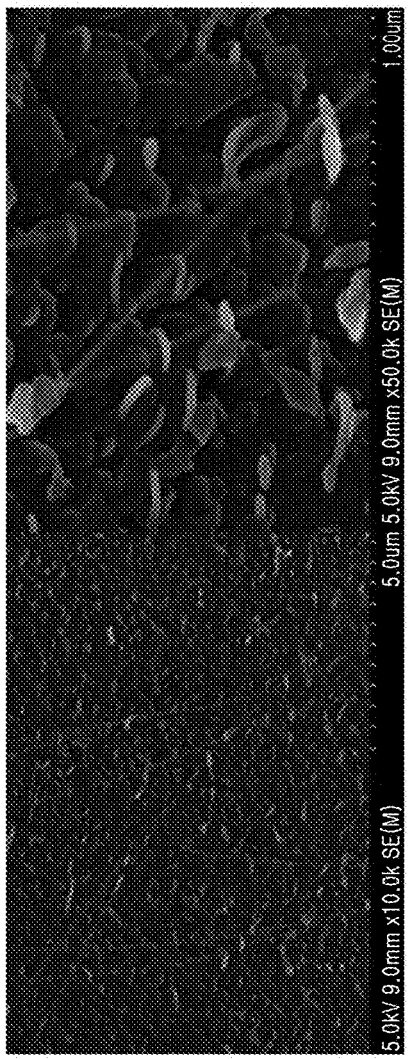
FIG. 2 is a SEM photograph obtained by imaging a surface of a polyamide film according to embodiment 7 of the present invention.
Figure 3:
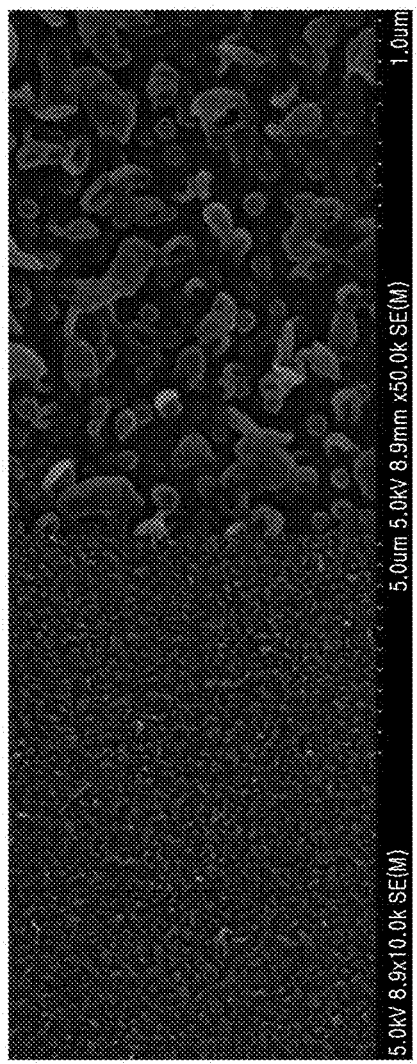
FIG. 3 is a SEM photograph obtained by imaging a surface of a polyamide film according to comparative example 7 of the present invention.

Surfaces of the polyamide films of the reverse osmosis membranes fabricated according to Embodiment 7 and comparative example were imaged with a scanning electron microscope (SEM). FIGS. 2 and 3 illustrate the captured images. Based on FIGS. 2 and 3, it can be seen that the reverse osmosis membrane according to Embodiment 7 has a surface area larger than that of the reverse osmosis membrane according to comparative example.

While the present invention has been shown and described in connection with the embodiments, it will be apparent to those skilled in the art that modifications and variations can be made without departing from the spirit and scope of the invention as defined by the appended claims.

The invention claimed is:

1. A reverse osmosis membrane comprising:
   a porous support;
   a silver nanowire layer formed on the porous support; and
   a polyamide film formed on the silver nanowire layer.

2. The reverse osmosis membrane of claim 1, wherein the silver nanowire layer has a thickness equal to 1% to 50% of the polyamide film.

3. The reverse osmosis membrane of claim 1, wherein the porous support is formed by coating non-woven fabric with one or more compounds selected from the group consisting of polysulfone, polyethersulfone, polycarbonate, polyethyleneoxide, polyimide, polyetherimide, polyetheretherketone, polypropylene, polymethylpentene, polymethylchloride, and polyvinylidene fluoride.

4. The reverse osmosis membrane of claim 1, wherein the polyamide film is formed through interfacial polymerization between an amine compound and an acyl halide compound.

5. The reverse osmosis membrane of claim 4, wherein the amine compound is one or more compounds selected from the group consisting of m-phenylenediamine, p-phenylenediamine, 1,3,6-benzenetriamine, 4-chloro-1,3-phenylenediamine, 6-chloro-1,3-phenylenediamine, 3-chloro-1,4-phenylenediamine, and any mixture thereof.

6. The reverse osmosis membrane of claim 4, wherein the acyl halide compound is one or more compounds selected from the group consisting of trimesoylchloride, isophthaloylchloride, and terephthaloylchloride.

7. The reverse osmosis membrane of claim 1, wherein the reverse osmosis membrane has an initial salt rejection coefficient equal to or greater than 98% and an initial permeate flow rate equal to or greater than 44 gallon/ft²·day, having excellent chlorine-resistance and anti-contamination properties.

8. The reverse osmosis membrane claim 1, wherein the reverse osmosis membrane has a salt rejection coefficient equal to or greater than 96% and a permeate flow rate equal to or greater than 36 gallon/ft²·day when two hours have elapsed after the injection of casein.

9. The reverse osmosis membrane of claim 1, wherein the reverse osmosis membrane has a salt rejection coefficient equal to or greater than 90% and a permeate flow rate equal to or greater than 40 gallon/ft²·day when twelve hours have elapsed after the injection of an NaOCl aqueous solution of 2,000 ppm.

10. A fabrication method of a reverse osmosis membrane, the method comprising:
    coating a porous support with an aqueous amine solution including silver nanowires to form a silver nanowire layer; and
    bringing the silver nanowire layer into contact with an aliphatic hydrocarbide-based organic solution including acyl halide to form a polyamide film.

11. The fabrication method of claim 10, wherein the aqueous amine solution contains the silver nanowires in the amount of 0.001 wt % to 0.5 wt %.

* * * * *